US012754038B2

(12) United States Patent
Lee et al.

(10) Patent No.: US 12,754,038 B2
(45) **Date of Patent: *Oct. 6, 2026**

(54) AUTOMATIC SELECTION OF MAP DETAIL LEVELS

(71) Applicant: Uber Technologies, Inc., San Francisco, CA (US)

(72) Inventors: Seung Woo Lee, San Francisco, CA (US); Christopher Moore, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/625,062

(22) Filed: Apr. 2, 2024

(65) Prior Publication Data

US 2024/0247943 A1 Jul. 25, 2024

Related U.S. Application Data

(63) Continuation of application No. 17/834,008, filed on Jun. 7, 2022, now Pat. No. 11,976,934, which is a (Continued)

(51) Int. Cl.
*G01C 21/36* (2006.01)
*G01C 21/00* (2006.01)

(52) U.S. Cl.
CPC ....... *G01C 21/367* (2013.01); *G01C 21/3676* (2013.01); *G01C 21/3682* (2013.01); *G01C 21/3881* (2020.08)

(58) Field of Classification Search
CPC ............ G01C 21/3889; G01C 21/3682; G01C 21/367; G01C 21/3881; G01C 21/3676
See application file for complete search history.

(56) References Cited

U.S. PATENT DOCUMENTS 7,859,536 B2 * 12/2010 Poppen ................. G06T 11/203 345/441
8,880,336 B2 * 11/2014 van Os ............. G01C 21/3415 348/14.03
(Continued)

FOREIGN PATENT DOCUMENTS

| | | | |
|---|---|---|---|
| AU | 2018395184 | B2 | 11/2021 |
| JP | 2000-081339 | A | 3/2000 |
| WO | WO-2019130204 | A1 | 7/2019 |

OTHER PUBLICATIONS

European Patent Office, Extended European Search Report and Opinion, EP Patent Application No. 18895379.8, Sep. 8, 2021, seven pages.
(Continued)

*Primary Examiner* — Navid Z. Mehdizadeh
*Assistant Examiner* — Jared C Bean
(74) *Attorney, Agent, or Firm* — Schwegman Lundberg & Woessner, P.A.

(57) ABSTRACT

Route guidance using less client device power and bandwidth is enabled by automatically selecting portions of a map to display with higher and lower levels of detail. An origin location and destination location are displayed at a higher level of detail, while portions between origin and destination are displayed at a lower level of detail. A user of a transportation service may request a ride, specifying her pickup location and destination locations using a map rendered at a higher level of detail. While waiting for pickup, and while in route to the destination location, the user may consult a map that is rendered at a lower level of detail. When multiple users participate as riders in a transportation service, sharing a common driver but each having different pickup and drop off locations, portions of a map may be rendered differently for each user.

20 Claims, 6 Drawing Sheets

Related U.S. Application Data continuation of application No. 16/235,904, filed on Dec. 28, 2018, now Pat. No. 11,359,929, which is a continuation of application No. PCT/IB2018/060551, filed on Dec. 22, 2018.

(60) Provisional application No. 62/612,558, filed on Dec. 31, 2017.

(56) References Cited

U.S. PATENT DOCUMENTS

| | | | | |
|---|---|---|---|---|
| 2003/0229441 | A1* | 12/2003 | Pechatnikov | G01C 21/3611 701/411 |
| 2007/0288162 | A1* | 12/2007 | Furukawa | G01C 21/367 701/431 |
| 2009/0046111 | A1* | 2/2009 | Joachim | G01C 21/367 345/173 |
| 2010/0324816 | A1* | 12/2010 | Highstrom | G01C 21/367 701/533 |
| 2013/0345962 | A1* | 12/2013 | van Os | G01C 21/3667 701/416 |
| 2014/0365120 | A1* | 12/2014 | Vulcano | G01C 21/362 701/532 |
| 2014/0365944 | A1* | 12/2014 | Moore | G09B 29/003 715/772 |
| 2015/0285654 | A1* | 10/2015 | Kögler | G09B 29/106 701/409 |
| 2015/0356118 | A1* | 12/2015 | Kalai | G01C 21/367 345/520 |
| 2016/0102988 | A1* | 4/2016 | Kalai | G01C 21/3881 701/428 |
| 2017/0192637 | A1* | 7/2017 | Ren | G06F 3/04817 |
| 2017/0287191 | A1* | 10/2017 | Zawada | G06T 7/00 |
| 2020/0300638 | A1* | 9/2020 | Pfeifle | G01C 21/3881 |

OTHER PUBLICATIONS

PCT International Search Report and Written Opinion, PCT Patent Application No. PCT/IB2018/060551, May 8, 2019, 12 pages.

United States Office Action, U.S. Appl. No. 16/235,904, May 26, 2021, 20 pages.

United States Office Action, U.S. Appl. No. 16/235,904, Oct. 12, 2021, 23 pages.

United States Office Action, U.S. Appl. No. 17/834,008, Jan. 6, 2023, 7 pages.

"Australian Application Serial No. 2018395184, First Examination Report mailed Sep. 17, 2020", 4 pgs.

"Australian Application Serial No. 2018395184, Response filed Jun. 9, 2021 to First Examination Report mailed Sep. 17, 2020", 21 pgs.

* cited by examiner

AUTOMATIC SELECTION OF MAP DETAIL LEVELS

CROSS-REFERENCE TO RELATED APPLICATIONS

This application is a continuation of U.S. patent application Ser. No. 17/834,008. Filed Jun. 7, 2022, which is a continuation of U.S. patent application Ser. No. 16/235,904, filed Dec. 28, 2018, now U.S. Pat. No. 11,359,929, which is a continuation of PCT Application No. PCT/IB2018/060551, filed Dec. 22, 2018, which claims the benefit of U.S. Provisional Application 62/612,558, filed on Dec. 31, 2017, all of which are incorporated by reference herein in their entirety.

BACKGROUND

Field

The described embodiments relate generally to providing navigation route guidance, and more particularly, to dynamically determining a level of detail at which to render a digital map according to a user's position along the route.

Description of Related Art

Position information and navigation route guidance are typically provided to users of client devices with the assistance of digital maps. Digital maps are rendered at particular zoom levels, with higher zoom levels representing smaller scales. For example, a digital map may be rendered at a zoom level in which one inch on the digital map represents five hundred meters of actual distance. Digital maps are also rendered at particular levels of detail (LODs), with each higher level of detail including additional features. For example, a digital map rendered at a higher level of detail may include secondary roads, more points of interest (POIs), and more labeled features, while a digital map rendered at a lower level of detail may include only primary roads, show fewer or no POIs, and label fewer features.

When using a client device, receiving and rendering a digital map consumes bandwidth and power. Both the bandwidth and power consumption increase with the complexity of the map being rendered.

SUMMARY

Described embodiments enable navigation route guidance using less client device power and bandwidth by automatically selecting which portions of a digital map to display on the client device with higher levels of detail and which portions to display with lower levels of detail. For example, in one embodiment an origin location and destination location are displayed at a higher level of detail, while portions of a route between the origin location and destination location are displayed at a lower level of detail. Portions of the route that involve turns or other complex maneuvers may also be rendered at higher levels of detail.

Described embodiments also include displaying digital maps to a client device user who is a user of a transportation service. For example, a user may use an application on her client device to request a ride, specify her pickup location, and specify her destination location. The pickup locations and destination locations may be displayed on her client device using a digital map rendered at a higher level of detail. While waiting for a driver to pick her up, and while en route to the destination location, the user may consult a digital map displayed on her client device that is rendered at a lower level of detail. In one embodiment, multiple users participate as riders in a transportation service, sharing a common driver but each having different pickup and drop off locations. In this embodiment, portions of a map may be rendered at one level of detail for one of the users, but the same region of the map may be rendered at a different level of detail for another user, according to their respective pickup and drop off locations.

The figures and the following description relate to various embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Network systems acting as navigation service providers may be used to facilitate navigation service between client devices operating within an environment. For example, a navigation service provider system may be used to provide routes, digital maps, and navigation route guidance to client devices traversing road networks in the environment. In some configurations, the navigation service provider system may be configured to determine levels of detail for digital maps and navigation route guidance that reduce the amount of power and bandwidth required to facilitate navigation service. For example, the navigation service provider may provide some portions of a navigation route guidance at a high level of detail while providing other portions of the navigation route guidance at a lower level of detail.

Navigation Service Environment

Figure 1:
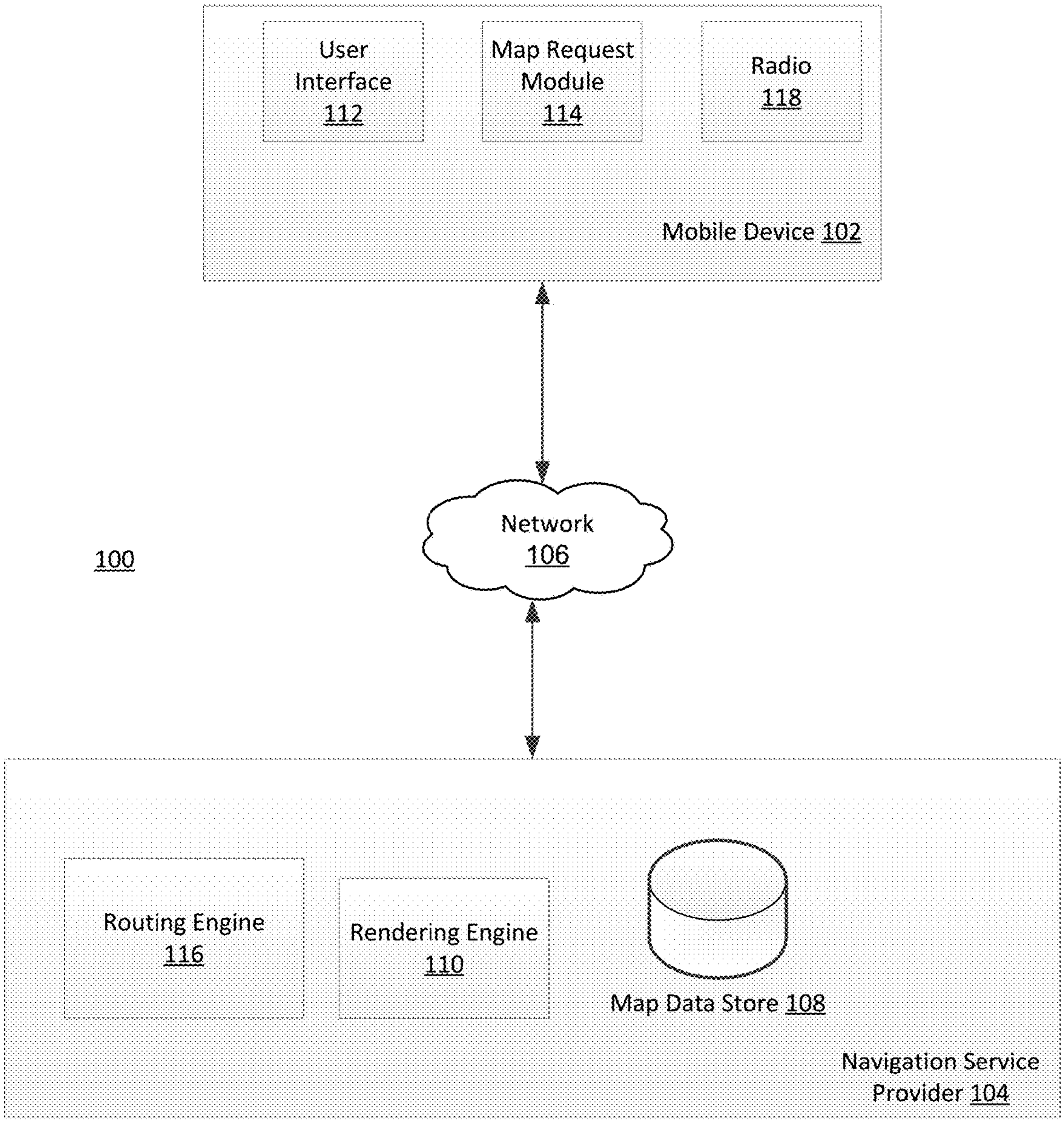
FIG. 1 illustrates an environment for providing automatic selection of map detail levels, in accordance with one embodiment.

FIG. 1 illustrates an environment 100 for providing automatic selection of map detail levels in accordance with one embodiment. Environment 100 includes a client device 102 and a navigation service provider (NSP) system 104 that communicate with each other over a network 106. The road network can be represented as a digital map that can be stored on NSP system 104. The NSP system 104 can provide digital maps of the environment 100 to client device 102 and client device 102 can display the digital map. Additionally, NSP system 104 can determine a route from a first location to a second location using the digital map. The route also includes any number of locations between the first location and the second location. NSP system 104 can determine and provide navigation route guidance for the route to client device 102. Route guidance, in various embodiments, includes a visual depiction (e.g., highlighted road segments) of a route from a first location to a second location shown on a digital map. Route guidance may also include other forms of route guidance for the route, including, for example, textual guidance, audio guidance, visual guidance, etc.

Client device 102 is a computing device used by a user to obtain route guidance and view digital maps. In one embodiment, client device 102 includes a radio 118, a user interface 112, and a map request module 114. Client device 102 may be a smartphone, tablet, portable computer, or other such device. Client device 102 may also be a purpose-built device such as a hand-held navigation computer. Client device 102 includes software e.g., an application or operating system that implements the various embodiments of the invention in whole or in part. In some embodiments, the capabilities of client device 102 may also be provided by a computer system installed within a vehicle, such as, for example, an in-car navigation system.

Client device 102 includes a radio 118 for communicating with NSP system 104 via network 106. Methods of communication between client device 102 and network 106 may include one or more of cellular, satellite, LAN, WAN, or any suitable protocol that supports the exchange of data described here. In various embodiments, radio 118 also includes a GPS receiver that provides positioning information identifying a current position of client device 102.

Client device 102 includes a user interface 112 for displaying digital maps and route guidance. User interface 112 also allows a user to specify information, view and/or manipulate a digital map, and view and/or manipulate route guidance. For example, a user can view her current location, specify an origin location and a destination location, and request route guidance from the origin location to destination location. In various embodiments, locations may be specified by entering address information (e.g., 350 $5^{th}$ Avenue, New York, NY), point-of-interest (POI) information (e.g., "Empire State Building"), or by selecting a point on a displayed digital map. Once an origin and destination location have been specified by the user, client device 102 requests and obtains route guidance information from NSP system 104 via network 106.

NSP system 104 receives requests for route guidance and provides route guidance and digital maps in response. NSP system 104 includes a routing engine 116, a rendering engine 110, and a map data store 108. NSP system 104 may be operated, for example, by an entity that provides mapping, routing, and guidance services, or by some other entity.

Routing engine 116 receives a request for route guidance, including the origin location and destination location, from client device 102 and in response determines a route along segments of the road network from the origin location to the destination location. Determination of a route may be performed according to any number of conventionally known algorithms. Once routing engine 116 determines the route, rendering engine 110 renders a digital map to be provided to client device 102.

Note that while for purposes of illustration we describe segments as road segments within a road network, in various other embodiments the road network may include segments that are traversed by foot, motor vehicle, bicycle, or other form of travel.

Rendering engine 110 renders (i.e., creates, generates, etc.) a digital map using map data stored in map data store 108. The map data includes information about the road network within the geographic regions described by the map data, and may include other features such as bodies of water, topographical characteristics, and POIs.

Map data store 108 also stores map properties that describe characteristics of road segments. For example, the map properties may include navigation rules such as speed limits and road segment directionality (e.g., one-way or two way). The navigation rules can also include properties about intersections, such as, for example, turn restrictions, stop-light timing information, and connecting road segments. Other map properties may include traffic history, traffic conditions, addresses on the road segment, length of the road segment, and type of the road segment (e.g., surface street, residential, highway, toll, etc.). In some embodiments, the map properties also include properties describing the geographic region as a whole or portions of the geographic region. For example, the properties may include weather within the geographic region, geopolitical boundaries (e.g., city limits, county borders, state borders, country borders), and topological features. Each of the features or category of features, may have an associated level of detail as described further below.

A digital map includes one or more rendered tiles, each representing a portion of the digital map. In various embodiments, the dimensions of a rendered tile are of a fixed size when displayed in a user interface. Therefore, a digital map may be displayed as an arrangement (e.g., a grid) of rendered tiles. For example, a particular user interface 112 might accommodate display of a 10-by-10 tile grid.

The geographical area covered by a tile depends upon the zoom level of the digital map. In one embodiment, for example, rendering engine 110 initially selects a zoom level that includes the complete route from the origin location to the destination location, and renders the digital map at that zoom level. Continuing the previous example, rendering engine 110 renders a digital map with a 10-by-10 tile grid that displays the route from the origin location to the destination location when displayed on the particular user interface 112.

Rendering engine 110 also selects, for each tile, a level of detail (LOD) at which to render the tile. In various embodiments, map data store 108 associates an LOD value with each feature of the digital map. For example, major highways and bodies of water may have a low LOD value, while tertiary roads and streams may have a high LOD value. Features of the digital map such as small curves in road segments, the shapes of rivers and streams, etc., are also simplified when included at lower LODs, for example as described in U.S. Pat. No. 7,859,536, incorporated by reference.

In one embodiment, rendering engine 110 renders the tiles containing the origin location and destination locations at a higher LOD than it does the remainder of the tiles. This accounts for what is typically an increased complexity involved in beginning or ending a route—for example, if a route begins with navigation to a freeway, proceeds along the freeway, and then exits the freeway to arrive at the destination, a higher LOD near the origin and destination locations enables a user to more easily navigate while near those locations, while a lower LOD displayed along the freeway portion of the route is adequate, since little maneuvering or complex navigation is required of the user.

In other embodiments, rendering engine 110 computes a complexity score for intervals along the route. A complexity score is a measure of complexity for navigation elements such as, for example, turns onto different streets, changes in the road direction (e.g., switchbacks), changes in road names, and transitions between roads of different priority (e.g., primary, secondary and tertiary roads). For tiles displaying intervals (portions) of the route that have a complexity score higher than a threshold score, rendering engine 110 renders the tile at a higher LOD, i.e. an LOD sufficiently high to include the required navigation elements. Rendering engine 110 renders the remainder of the tiles at a lower LOD. The threshold score may be selected by the implementer (e.g., an administrator of NSP system 104), or by the user—for example, in one embodiment a user interface element such as a slider allows the user to adjust the level of complexity at which a tile will be rendered at a higher LOD. Alternatively, a user can select certain navigation elements, e.g., change of road name, turns, etc., that will cause a tile containing those navigation elements to be rendered at a higher LOD.

Once rendering engine 110 renders the digital map, NSP system 104 returns the digital map and route guidance to client device 102. Client device 102 then displays the tiles of the digital map and the route guidance to the user in user interface 112.

In various embodiments, the user may request that one or more tiles displayed in user interface 112 be replaced by tiles rendered with higher or lower LOD's. For example, in one embodiment if the user taps on a tile that is rendered with a lower LOD, map request module 114 requests a high-LOD replacement tile from NSP system 104 in response. Rendering engine 110 then renders the requested high-LOD replacement tile and returns the replacement tile to client device 102. Similarly, at the discretion of the implementer, user interface 112 may include additional user interface elements to control whether individual tiles or groups of tiles (e.g., all displayed tiles, all tiles along the route, tiles within a particular distance of the route, etc.) are displayed at a higher or at a lower LOD.

In various embodiments, a user may manipulate the displayed digital map by, for example panning the digital map across user interface 112. Panning the map may cause client device 102 to request additional tiles from NSP system 104 for displaying on user interface 112. The request for the new tiles may specify that newly rendered tiles should be rendered at a higher LOD.

In various embodiments, if a user changes the zoom level of the map displayed in user interface 112, client device 102 requests new map tiles from NSP system 104. Rendering engine 110 renders the requested map tiles at the requested zoom level, and selects a LOD for each tile according to the methods described above. In one embodiment, if a user requests a higher zoom level than the initial zoom level, rendering engine 110 automatically selects a higher LOD for all tiles rendered in response to the request for a higher zoom level.

In one embodiment, client device 102 caches map tiles that have been received from NSP system 104, and map request module 114 substitutes the highest-LOD tile available in the cache for a particular tile, instead of requesting the tile from NSP system 104. Cached tiles may have a particular time to live, and once a cached tile has expired, it is removed from cache and a new tile is requested as described above. In another example, cached tiles may only be stored if client device 102 remains within a threshold distance of the geographical area represented by the tile.

Selecting Levels of Detail for Displaying Route Guidance

Figure 2:
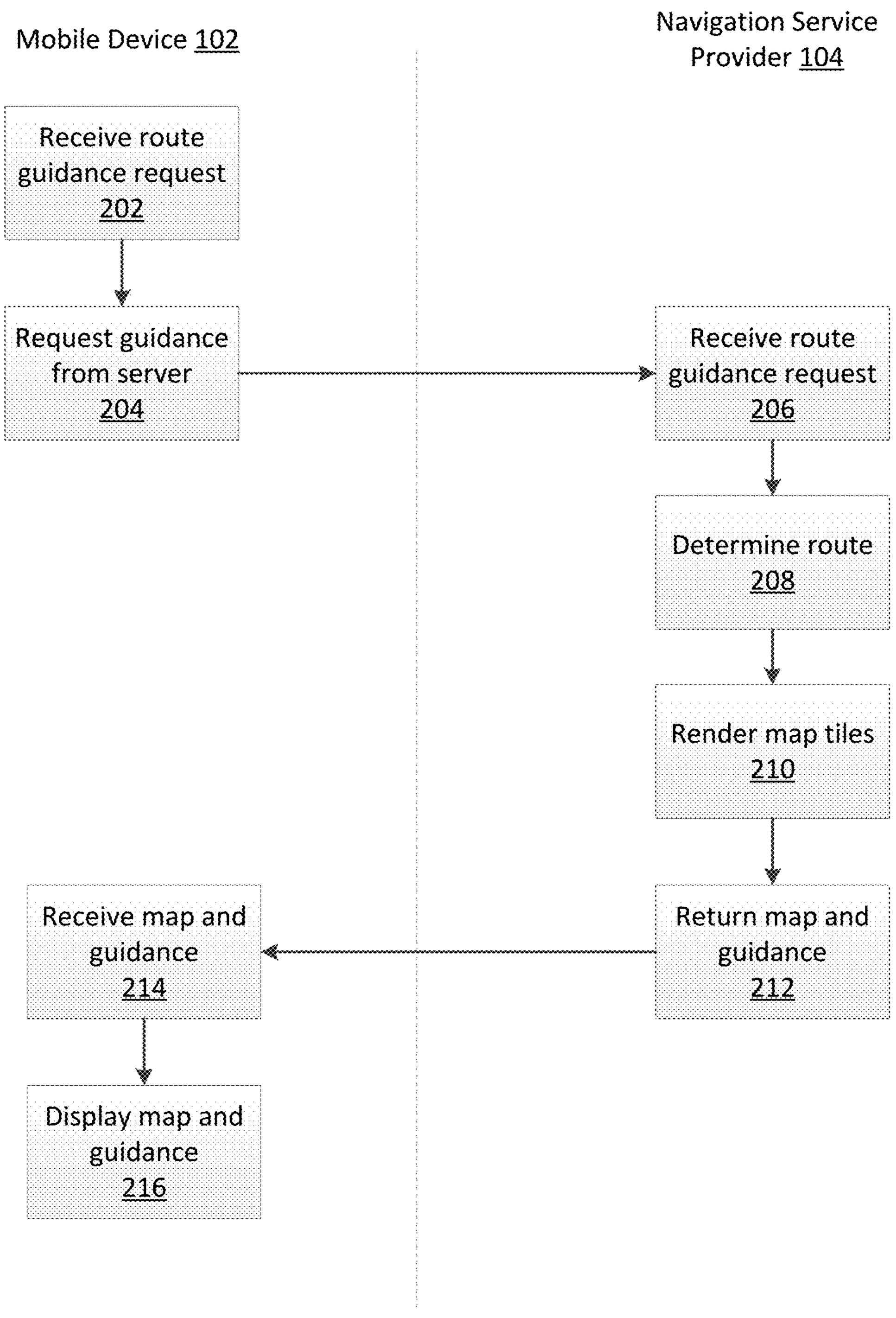
FIG. 2 is a flowchart illustrating a method for automatically selecting levels of detail for displaying navigation route guidance, in accordance with one embodiment.

FIG. 2 is a flowchart illustrating a method for automatically selecting levels of detail for displaying route guidance to a user, in accordance with one embodiment. The illustrated method may be implemented using client device 102 and NSP system 104 described in regards to FIG. 1.

A user requests route guidance using user interface 112 of client device 102 and map request module 114 receives 202 the request. The user may specify an origin location and destination location for the route guidance either by reference to an address, a POI name, or by selecting a location using a digital map. In embodiments where the user selects a location using a digital map displayed on a user interface 112, client device 102 may display a cached version of a digital map stored locally on client device 102 as noted above. Alternatively a user may request a high-LOD set of map tiles from NSP system 104 for areas surrounding the user's present position or, if the user pans the displayed digital map, tiles that cover the region panned to.

Once the user has specified at least an origin location and destination location, map request module 114 requests 204 a digital map including route guidance information from NSP system 104 via network 106. The request may include the origin location and destination location specified by the user. In some examples, the request may also include any other parameters specified by the user or requesting map request module 114 indicating a preferred LOD or zoom level.

Routing engine 116 of NSP system 104 receives 206 the route guidance request and determines 208 a route from the origin location to destination location. Rendering engine 110 renders 210 one or more sets of map tiles for a digital map using map data from map data store 108. Rendering engine 110 may render the one or more sets of tiles according to the specified LOD received from the client device, a complexity score calculated for portions of the route, or a predetermined LOD implemented by NSP system 104. NSP system 104 returns 212 the rendered digital map including the route guidance to client device 102 via the network 106.

The route guidance in various embodiments includes a visual depiction of the route shown on the map, and may also include text-based or other forms of instructions. Map request module 114 of client device 102 receives 214 the rendered digital map and route guidance, and displays 216 the digital map and route guidance in user interface 112. As the user progresses through the route, client device 102 may show the user's position (e.g., as determined by an on-board radio 118 such as a GPS receiver) overlaid on the digital map. As described above, the user may request that all or portions of the digital map be displayed at a higher LOD, in which case map request module 114 requests replacement tiles from rendering engine 110, specifying the higher LOD desired.

In one embodiment, map request module 114 automatically requests a higher LOD tile containing the current position of the client device 102. This prevents power and bandwidth consumption required to render and obtain high-LOD map tiles for portions of a route the user has not traversed, and may not traverse if the user chooses to depart from the route, end her journey early, etc. In some embodiments, portions of the map that are within a threshold distance (e.g., 800 m) of the route are rendered at a higher LOD, while the remainder of the map is rendered at a lower LOD.

Rendering Map Tiles

Figure 3:
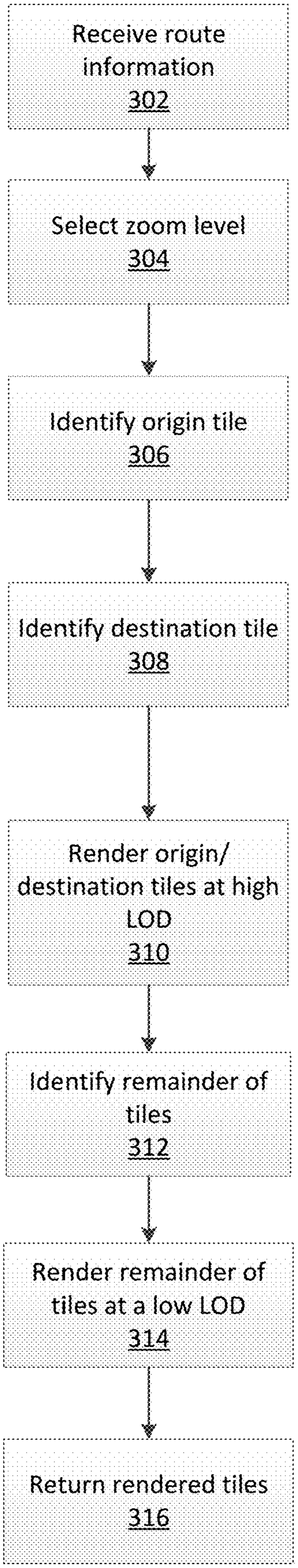
FIG. 3 is a flowchart illustrating a method for rendering map tiles, in accordance with one embodiment.

FIG. 3 illustrates in more detail the rendering of map tiles performed by rendering engine 110 of NSP system 104 at step 210.

Rendering engine 110 receives 302 the route from the origin location to the destination location from routing engine 116 and selects 304 a zoom level. As described above, the zoom level in one embodiment is chosen such that the origin location and destination locations will be visible together on the route map provided to the client device 102 and displayed in user interface 112. In alternative embodiments, other zoom levels may be chosen, or a zoom level may be specified in the request received from client device 102.

Rendering engine 110 identifies 306 the tile including the origin location and identifies 308 the tile including the destination location. Rendering engine 110 renders 310 the origin tile and destination tile at a high LOD. Rendering engine 110 identifies 312 the remainder of the tiles to be sent to client device 102, and renders 314 those tiles at a lower LOD. NSP system 104 returns 316 route guidance and a digital map including the rendered tiles to client device 102.

In some embodiments, tiles near (e.g., adjacent, or within a threshold number of tiles) to the origin location and/or destination location may also be rendered at a higher LOD. This may be helpful, for example, where an origin location and/or destination location is near the edge of a tile, and rendering the neighboring tile at a low LOD may not provide sufficient guidance to the user. As noted above, a complexity score can be determined for intervals (e.g., an interval of distance, or an interval of time) of the route, and tiles exceeding a threshold complexity score can be rendered at a higher LOD.

In various embodiments, map data store 108 includes POIs that can be displayed on a rendered digital map. POIs include major landmarks, buildings, topographic features, and other distinctive features and locations of interest. As with other map data stored by map data store 108, POIs may have associated LODs, and thus are ordinarily only included in map tiles that have a level of at least the requisite detail. In some embodiments, rendering engine 110 includes certain POIs in rendered tiles even where the POI would not normally be included for the given level of detail. In a particular example, rendering engine 110 determines whether a change in route (e.g., a turn, a change in street name, etc.) occurs near a POI and, if so, includes the POI in the rendered tile regardless of the POI's associated LOD value.

In some embodiments, the user has an account on NSP system 104, and NSP system 104 maintains a record of previous route guidance provided to client device 102 associated with the user. In some such embodiments, rendering engine 110 includes a POI in a rendered map provided to the user if the POI was previously provided to the user as part of a previous route. This assists the user by providing her with a POI she may recognize, having previously passed by it.

Transportation Service Provider Example

Figure 4:
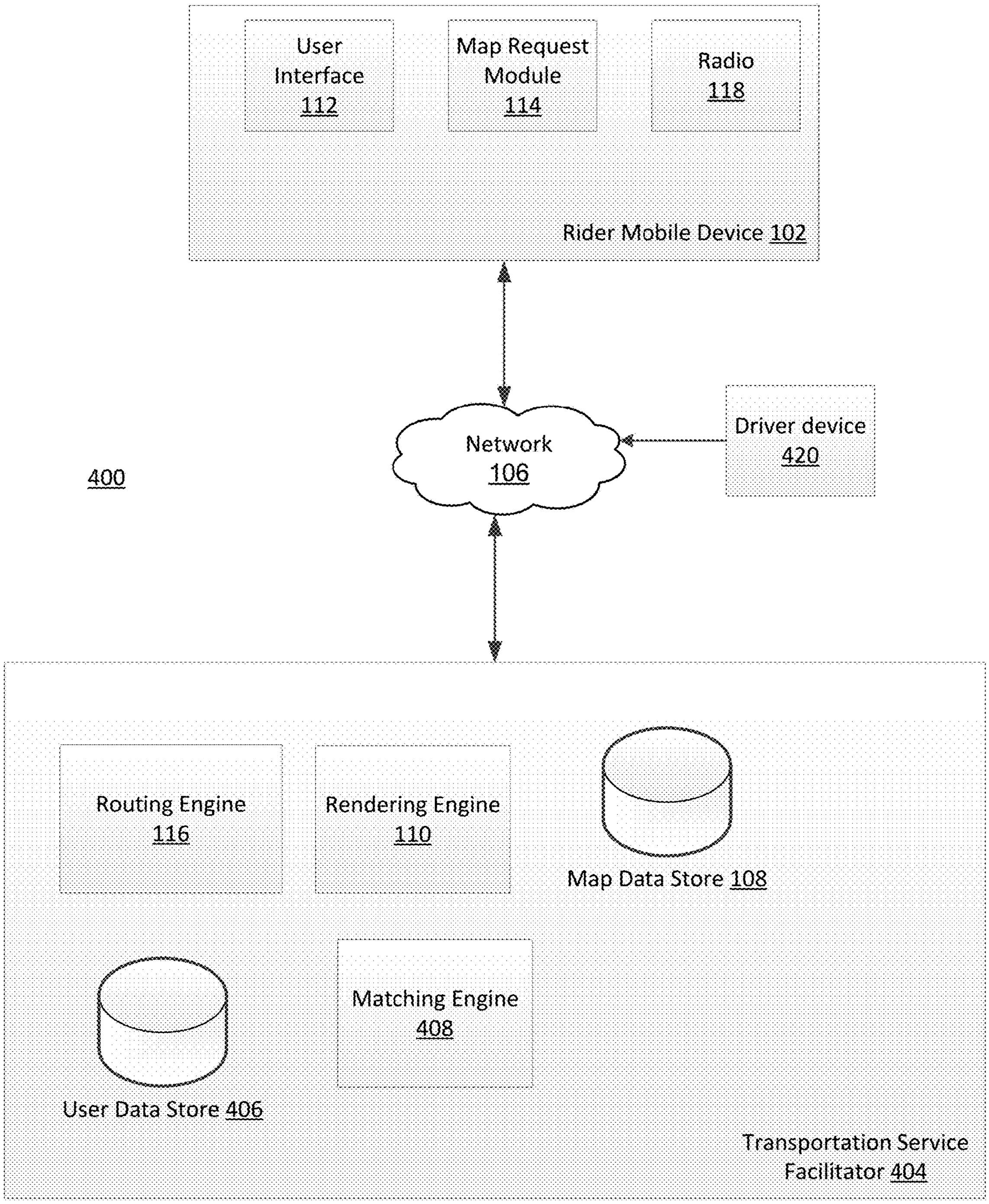
FIG. 4 illustrates an environment in which embodiments of the invention operate in connection with a transportation service facilitator.

FIG. 4 illustrates an environment 400 in which embodiments of the invention operate in connection with a service facilitator. The service facilitator, for example, may be a transport service facilitator (TSF) system 404 that facilitates matching of drivers who provide transport service to riders who request transportation. Other service facilitation applications are also possible (e.g., delivery service, etc.). A TSF system 404 includes the elements previously described with respect to NSP system 104, additionally including user data store 406 and matching engine 408. FIG. 4 also illustrates a driver client device 420, rider client device 102 (which is an example of client device 102 of FIG. 1), and network 106. Driver client device 420 may be similarly configured to, and provide similar functionality to, client device 102 of FIG. 1. In some embodiments, driver client device 420 may be an autonomous vehicle.

In some embodiments, users such as drivers and riders use their client devices 420 and 102, respectively, to register with the TSF system 404. For example, users may register by creating accounts and providing user information (e.g., contact information, a home or office address, or billing information) to TSF system 404. TSF system 404 can store the user information and transport service records in the user data store 406. For instance, information including transport service records describing transport service that a rider received from drivers, or transport service that a driver provided to riders may be stored in user data store 406. TSF system 404 can associate feedback received from a user or data from transport service taken with the user's registered account.

Matching engine 408 selects drivers to provide transport service using transport service requests received from riders. For example, matching engine 408 receives a transport service request from a rider client device 102 and determines a set of candidate drivers that are online, available to provide transport service, and near the requested pickup location (i.e., origin location) for the rider. Matching engine 408 selects a driver from the set of candidate drivers to which it transmits an assignment request. The driver can be selected based on the driver's location, the pickup and/or destination location, the type of the driver, the amount of time the driver has been waiting for an assignment request and/or the destination of the trip, among other factors.

In some embodiments, the matching engine 408 selects the driver who is closest to the pickup location or who will take the least amount of time to travel to the pickup location (e.g., having the shortest estimated travel time to the pickup location based on routing and map information from a data source). The matching engine 408 sends an assignment request to the selected driver. If the driver accepts the assignment request, then the matching engine 408 assigns the driver to the rider. If the driver rejects the assignment request, then the matching engine 408 selects another driver and sends a subsequent assignment request to the client device 102 for that driver.

In various embodiments, when a user uses rider client device 102 to request a ride, she is presented with a map in user interface 112, through which she can specify her pickup (origin) location, and may in some embodiments also specify a drop-off (destination) location. Map request module 114 displays a digital map showing the user's current location (e.g., based on a GPS signal from radio 118). To display the digital map, map request module 114 obtains the digital map from its cache, if available, and otherwise requests any needed tiles from system 404 at a high LOD to enable the user to accurately identify her pickup location.

In various embodiments, once the user has submitted her transport service request and been matched by matching engine 408 with a driver who is willing to provide the transportation service to the user, rider client device 102 displays a digital map to the user showing a current location of the driver's client device 420. The user interface 112 of the rider client device 102 enables the user to track the driver's progress to the pickup location. In various embodiments, map request module 114 requests tiles for this digital map in a lower LOD, since the user does not require a high level of detail to understand the driver's progress towards her.

Once the rider has been picked up by the driver and the trip is underway, the driver can obtain route guidance on his driver client device 420 in the manner described above, e.g., with respect to FIG. 2 and FIG. 3. The rider can also view her progress on her rider client device 102. In one embodiment, while the trip is underway map request module 114 obtains map tiles that are rendered at a low LOD, which provides the rider with context as to the progress of her journey, without requiring the power and bandwidth consumption involved in downloading high-LOD maps. In some embodiments, the area of the map including the rider's drop-off location is rendered at a higher LOD, while the remainder of the route is rendered at a low LOD. In some embodiments, the rider can obtain higher-LOD maps while on her trip by invoking user interface elements provided for that purpose.

In some embodiments, a different color scheme or theme is associated with low versus high LOD maps, which provides an immediate visual cue to the user as to which display mode is being used.

In some embodiments, TSF system 404 facilitates rides for multiple riders matched with a single driver, such that riders may share parts of their routes with each other. Consequently, each rider may have a different pickup and/or drop-off location. In various embodiments, each rider's client device 102 requests maps with an LOD appropriate for their individual phase of their journey. For example, two riders may be in a driver's car simultaneously, with the first rider having a drop-off location at 600 Dulany Street and a second rider having a drop-off location at 1600 King Street. The map request module 114 of the first rider's device 102 includes a high-LOD rendering of the area surrounding 600 Dulany Street, while the remainder of the map is rendered at lower LOD—including, if shown at all, the area surrounding 1600 King Street. Conversely, the map request module 114 of the second rider's device 102 includes a high-LOD rendering of the area surrounding 1600 King Street, but not 600 Dulany Street. Similarly, a third rider awaiting pickup by the same driver may consult his rider client device 102 while awaiting pickup, and the region surrounding that rider's pickup location is rendered at a high-LOD, but that same region is displayed at low LOD for his two co-riders, who are already on board and en route.

Example Network System

Figure 5:
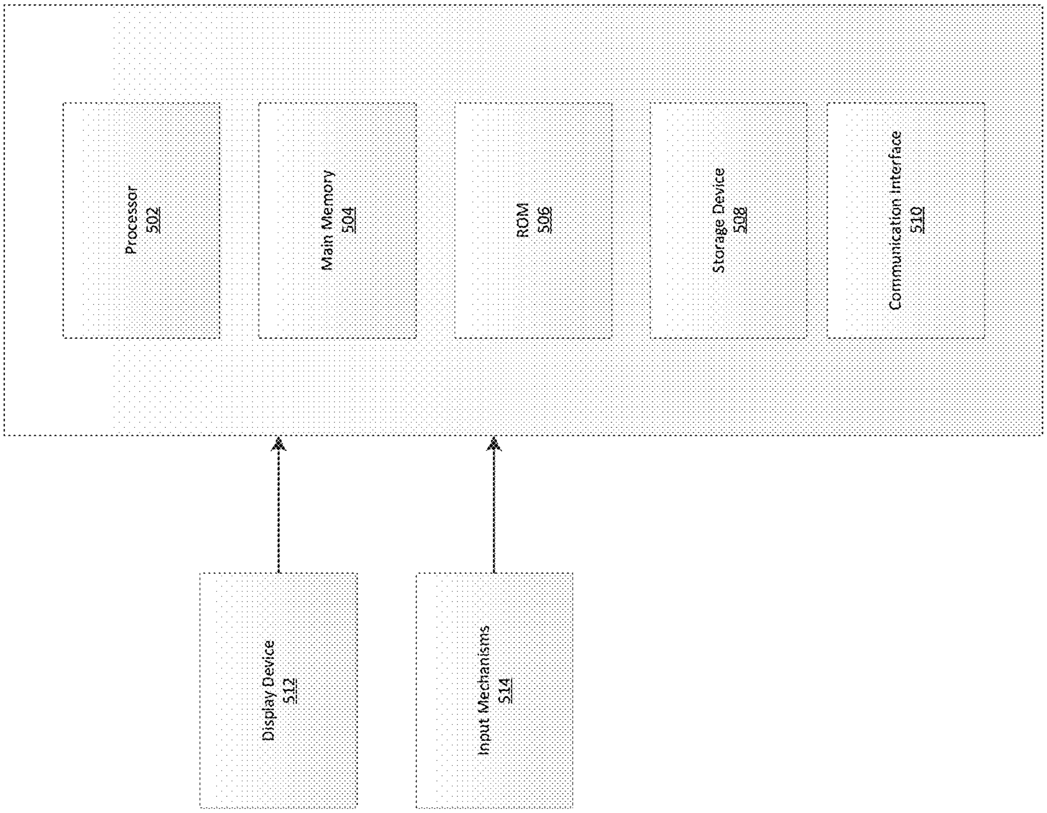
FIG. 5 is a diagram illustrating a computer system upon which embodiments described herein may be implemented.

FIG. 5 is a diagram illustrating a computer system upon which embodiments described herein may be implemented. For example, in the context of FIG. 1, NSP system 104 may be implemented using a computing system 500 such as described by FIG. 5. Similarly, in the context of FIG. 4, TSF system 404 may be implemented using a computing system 500 such as described by FIG. 5. Systems 104 and/or 404 may also be implemented using a combination of multiple computer systems 500 as described by FIG. 5, with each computer system implementing one or more of the components of systems 104 and/or 404. Multiple-computer-system implementations include networked systems, such as a networked client-server system.

In one implementation, computing system 500 includes processing resources such as one or more processors 502, as well as main memory 504, read only memory (ROM) 506, a storage device 508, and a communication interface 510. Computing system 500 includes the processor(s) 502 for processing information and main memory 504, such as a random access memory (RAM) or other dynamic storage device, for storing information and instructions to be executed by the processor(s) 502. Main memory 504 also may be used for storing temporary variables or other intermediate information during execution of instructions to be executed by processor(s) 502. Computing system 500 may also include ROM 506 or other static storage device for storing static information and instructions for processor(s) 502.

The storage device 508, such as a magnetic disk or optical disk, is provided for storing information and instructions. The communication interface 510 can enable computing system 500 to communicate with one or more networks (e.g., cellular network, network 106, etc.), through use of the network link (wireless or wireline). Using the network link, computing system 500 can communicate with one or more computing devices, and one or more servers.

In some variations, computing system 500 can be configured to receive sensor data (e.g., such as GPS data) from one or more location tracking devices via the network link. The sensor data can be processed by the processor 502 and can be stored in, for example, the storage device 508. The processor 502 can process the sensor data of a location tracking device in order to determine the path of travel of a transportation vehicle corresponding to the location tracking device. Extrapolated position information can be transmitted to one or more service requestor devices over the network to enable the service applications running on the service requestor devices to use the position information to present a visualization of the actual movement of the transportation vehicles.

Computing system 500 can also include a display device 512, such as a cathode ray tube (CRT), an LCD monitor, or a television set, for example, for displaying graphics and information to a user. An input mechanism, such as a keyboard that includes alphanumeric keys and other keys, can be coupled to systems 104 and/or 404 for communicating information and command selections to processor(s) 502. Other non-limiting, illustrative examples of input mechanisms 514 include a mouse, a trackball, touch-sensitive screen, or cursor direction keys for communicating direction information and command selections to processor(s) 502 and for controlling cursor movement on display device 512.

In various embodiments, storage device 508 stores any of user data store 406, map data store 108, rendering engine 110, routing engine 116, and matching engine 408 components described herein as computer executable instructions. During operation, the processor(s) 502 executes the instructions and loads the components into main memory 504. The instructions cause the processor(s) 502 to perform the method of FIG. 2 and FIG. 3. In this way, the processor(s) 502 coupled to main memory 504, read only memory (ROM) 506, storage device 508, and communication interface 510 (as described below in greater detail) is a special-purpose processor.

Examples described herein are related to the use of computing system 500 for implementing the techniques described herein. According to one embodiment, those techniques are performed by computing system 500 in response to processor(s) 502 executing one or more sequences of one or more instructions contained in main memory 504. Such instructions may be read into main memory 504 from another machine-readable medium, such as storage device 508. Execution of the sequences of instructions contained in main memory 504 causes processor(s) 502 to perform the process steps described herein. In alternative implementations, hard-wired circuitry may be used in place of or in combination with software instructions to implement examples described herein. Thus, the examples described are not limited to any specific combination of hardware circuitry and software.

Example Mobile Device

Figure 6:
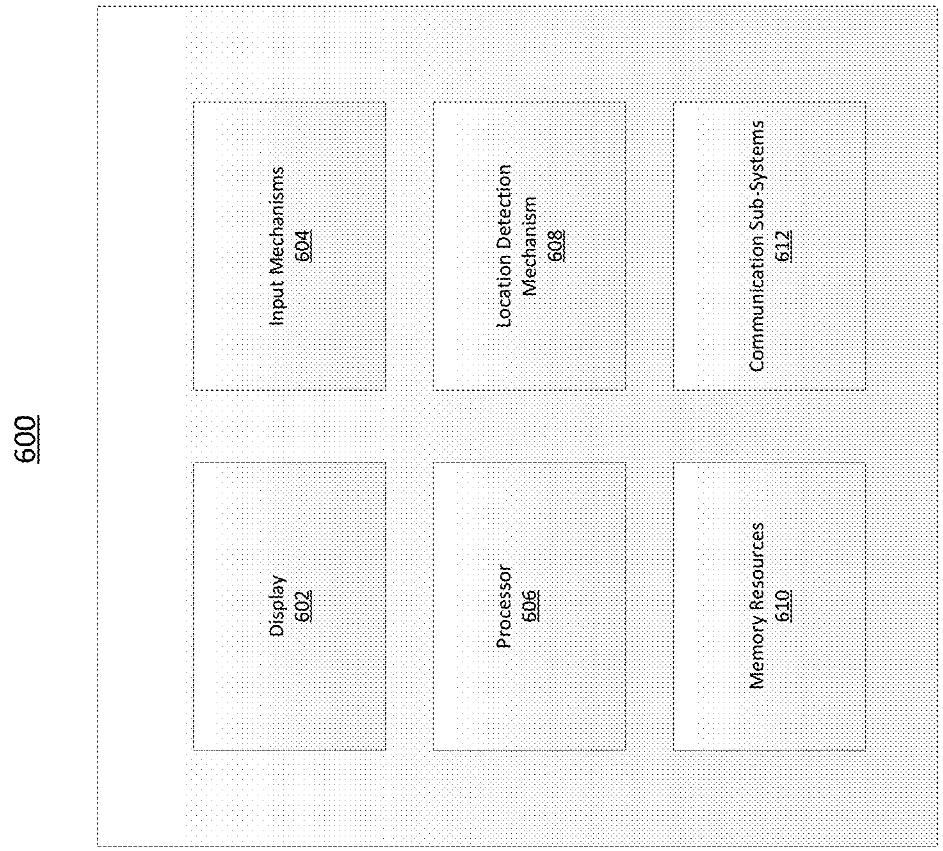
FIG. 6 is a diagram illustrating a mobile computing device upon which embodiments described herein may be implemented.

FIG. 6 is a diagram illustrating a mobile computing device 600 upon which embodiments described herein may be implemented as described above. For example, rider client device 102 and/or driver client device 420 may be implemented as an embodiment of mobile computing device 600.

In one embodiment, mobile computing device 600 may correspond a cellular device that is capable of telephony, messaging, and data services. Examples of such devices include smartphones, handsets or tablet devices for cellular carriers. Mobile computing device 600 includes a processor 606, memory resources 610, a display device 602 (e.g., such as a touch-sensitive display device), one or more communication sub-systems 612 (including wireless communication sub-systems), input mechanisms 604 (e.g., an input mechanism can include or be part of the touch-sensitive display device), and one or more location detection mechanisms (e.g., GPS module) 608. In one example, at least one of the communication sub-systems 612 sends and receives cellular data over data channels and voice channels.

The processor 606 is configured with software and/or other logic to perform one or more processes, steps and other functions described with implementations, such as those described herein. Processor 606 is configured, with instructions and data stored in the memory resources 610, to operate a service application as described herein. For example, instructions for operating the service application in order to display user interfaces can be stored in the memory resources 610 of the computing device 600.

The processor 606 can provide content to the display 602 by executing instructions and/or applications that are stored in the memory resources 610. In some examples, one or more user interfaces can be provided by the processor 606, such as a user interface for the service application, based at least in part on the received position information of the one or more transportation vehicles. While FIG. 6 is illustrated for a mobile computing device, one or more embodiments may be implemented on other types of devices, including fully-functional computers, such as laptops and desktops (e.g., PC).

Additional Considerations

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification Has Bean principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for providing route guidance on a client device providing a transport service, the method comprising:

receiving, from a processor of the client device, a request to provide the transport service, the request comprising a route for the transport service;

displaying, on the client device, a first portion of the route for the transport service using a first set of digital map tiles rendered at a first level of detail;

in response to receiving a request for a greater level of detail for the route:

requesting, by the processor of the client device, a second set of digital map tiles, each tile in the second set including a second portion of the route rendered at a second level of detail higher than the first level of detail;

determining a complexity score for a third portion of the route quantifying a navigational complexity of the route along the third portion; and responsive to the complexity score being above a threshold, requesting, by the processor of the client device, a third set of digital map tiles, each tile in the third set including a third portion of the route rendered at the second level of detail; and displaying, simultaneously on the client device, the route and at least some of the digital map tiles of the first set, at least some of the digital map tiles of the second set, and at least some of the digital map tiles of the third set.

2. The method of claim 1, wherein a digital map tile including an origin location for the route and a digital map tile including a destination location for the route are included in the first set of digital map tiles.

3. The method of claim 2, wherein displaying the route and at least some of the digital map tiles of the first set further comprises:

displaying the digital map tile including the origin location; and displaying the digital map tile including the destination location.

4. The method of claim 1, wherein a set of remainder digital map tiles including a set of locations between an origin location and a destination location of the route is included in the second set of digital map tiles.

5. The method of claim 4, wherein the set of locations is not included in the first set of digital map tiles.

6. The method of claim 4, wherein displaying the route and at least some of the digital map tiles of the second set further comprises:

displaying the set of remainder digital map tiles.

7. The method of claim 1, further comprising:

responsive to the complexity score being below the threshold, requesting, by the processor of the client device, a third set of digital map tiles, each tile in the third set including the third portion of the route rendered at a third level of detail higher than the first level of detail and less than the second level of detail.

8. A non-transitory computer-readable storage medium comprising computer program instructions for providing route guidance on a client device providing a transport service, the computer program instructions, when executed by one or more processors, causing the one or more processors to:

receive, from a processor of the client device, a request to provide the transport service, the request comprising a route for the transport service;

display, on the client device, a first portion of the route for the transport service using a first set of digital map tiles rendered at a first level of detail;

in response to receiving a request for a greater level of detail for the route:

request, by the processor of the client device, a second set of digital map tiles, each tile in the second set including a second portion of the route rendered at a second level of detail higher than the first level of detail;

determine a complexity score for a third portion of the route quantifying a navigational complexity of the route along the third portion; and responsive to the complexity score being above a threshold, request, by the processor of the client device, a third set of digital map tiles, each tile in the third set including a third portion of the route rendered at the second level of detail; and display, simultaneously on the client device, the route and at least some of the digital map tiles of the first set, at least some of the digital map tiles of the second set, and at least some of the digital map tiles of the third set.

9. The non-transitory computer-readable storage medium of claim 8, wherein a digital map tile including an origin location for the route and a digital map tile including a destination location for the route are included in the first set of digital map tiles.

10. The non-transitory computer-readable storage medium of claim 9, wherein displaying the route and at least some of the digital map tiles of the first set further causes the one or more processors to:

display the digital map tile including the origin location; and display the digital map tile including the destination location.

11. The non-transitory computer-readable storage medium of claim 8, wherein a set of remainder digital map tiles including a set of locations between an origin location and a destination location of the route is included in the second set of digital map tiles.

12. The non-transitory computer-readable storage medium of claim 11, wherein the set of locations is not included in the first set of digital map tiles.

13. The non-transitory computer-readable storage medium of claim 11, wherein displaying the route and at least some of the digital map tiles of the second set causes the one or more processors to:

display the set of remainder digital map tiles.

14. The non-transitory computer-readable storage medium of claim 8, wherein the computer program instructions, when executed, further cause the one or more processors to:

responsive to the complexity score being below the threshold, request, by the processor of the client device, a third set of digital map tiles, each tile in the third set including the third portion of the route rendered at a third level of detail higher than the first level of detail and less than the second level of detail.

15. A system comprising:

one or more processors; and a non-transitory computer-readable storage medium comprising computer program instructions for providing route guidance on a client device providing a transport service, the computer program instructions, when executed by one or more processors, causing the one or more processors to:

receive, from a processor of the client device, a request to provide the transport service, the request comprising a route for the transport service;

display, on the client device, a first portion of the route for the transport service using a first set of digital map tiles rendered at a first level of detail;

in response to receiving a request for a greater level of detail for the route:

request, by the processor of the client device, a second set of digital map tiles, each tile in the second set including a second portion of the route rendered at a second level of detail higher than the first level of detail;

determine a complexity score for a third portion of the route quantifying a navigational complexity of the route along the third portion; and responsive to the complexity score being above a threshold, request, by the processor of the client device, a third set of digital map tiles, each tile in the third set including a third portion of the route rendered at the second level of detail; and display, simultaneously on the client device, the route and at least some of the digital map tiles of the first set, at least some of the digital map tiles of the second set, and at least some of the digital map tiles of the third set.

16. The system of claim 15, wherein a digital map tile including an origin location for the route and a digital map tile including a destination location for the route are included in the first set of digital map tiles.

17. The system of claim 16, wherein displaying the route and at least some of the digital map tiles of the first set further causes the one or more processors to:

display the digital map tile including the origin location; and display the digital map tile including the destination location.

18. The system of claim 15, wherein a set of remainder digital map tiles including a set of locations between an origin location and a destination location of the route is included in the second set of digital map tiles.

19. The system of claim 15, wherein displaying the route and at least some of the digital map tiles of the second set causes the one or more processors to:

display the set of remainder digital map tiles.

20. The system of claim 19, wherein the computer program instructions, when executed, further cause the one or more processors to:

responsive to the complexity score being below the threshold, request, by the processor of the client device, a third set of digital map tiles, each tile in the third set including the third portion of the route rendered at a third level of detail higher than the first level of detail and less than the second level of detail.

* * * * *